US008930702B2

(12) United States Patent
Marien (10) Patent No.: US 8,930,702 B2
(45) Date of Patent: Jan. 6, 2015

(54) STRONG AUTHENTICATION TOKEN WITH ACOUSTIC DATA INPUT

(75) Inventor: Dirk Marien, Ranst (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 449 days.

(21) Appl. No.: 13/403,206

(22) Filed: Feb. 23, 2012

(65) Prior Publication Data
US 2012/0221859 A1    Aug. 30, 2012

Related U.S. Application Data

(60) Provisional application No. 61/446,779, filed on Feb. 25, 2011.

(51) Int. Cl.
*H04L 29/00* (2006.01)
*G06F 21/34* (2013.01)
*H04L 29/06* (2006.01)

(52) U.S. Cl.
CPC ............ *G06F 21/34* (2013.01); *H04L 63/0838* (2013.01); *G06F 2221/2153* (2013.01); *H04L 63/0853* (2013.01); *G06F 2221/2103* (2013.01)
USPC ........................................................ 713/172

(58) Field of Classification Search
CPC ................ H04L 9/32; G07F 7/10; G07F 7/08
USPC ........................................................ 713/172
See application file for complete search history.

(56) References Cited

U.S. PATENT DOCUMENTS

| 4,641,374 | A | * | 2/1987 | Oyama ........................ | 398/115 |
| 5,136,644 | A | | 8/1992 | Audebert et al. | |
| 5,668,876 | A | | 9/1997 | Falk et al. | |
| 7,083,090 | B2 | * | 8/2006 | Zuili ........................... | 235/383 |

FOREIGN PATENT DOCUMENTS

| EP | 1 211 841 | 6/2002 |
| EP | 1 788 509 | 5/2007 |
| WO | WO 01/58080 | 8/2001 |
| WO | WO 2005/011191 | 2/2005 |

OTHER PUBLICATIONS

International Search Report for PCT/US2012/026077 mailed Jun. 6, 2012.
International Search Report for PCT/US2012/026588 mailed Jun. 6, 2012.
Translation of P.R. of China First Office Action for Application No. 201290000462.8 dated Feb. 28, 2014.

* cited by examiner

*Primary Examiner* — Brandon Hoffman
*Assistant Examiner* — Michael D Anderson
(74) *Attorney, Agent, or Firm* — RatnerPrestia (57) ABSTRACT

Strong authentication tokens for generating dynamic security values having an acoustical input interface for acoustically receiving input data are disclosed. The tokens may also include an optical interface for receiving input data and may have a selection mechanism to select either the acoustical or the optical input interface to receive data. A communication interface may be provided to communicate with a removable security device such as a smart card and the token may be adapted to generate dynamic security values in cooperation with the removable security device. The acoustic signal received by the token may be modulated using a frequency shift keying modulation scheme using a plurality of coding frequencies to code the acoustical signal where each coding frequency may be an integer multiple of a common base frequency.

50 Claims, 5 Drawing Sheets

STRONG AUTHENTICATION TOKEN WITH ACOUSTIC DATA INPUT

CROSS REFERENCE TO RELATED APPLICATIONS

This application is related to and claims the benefit of U.S. provisional application Ser. No. 61/446,779 filed on Feb. 25, 2011, the contents of which are incorporated fully herein by reference.

FIELD OF THE INVENTION

The invention relates to strong authentication tokens for securing remote access to computers and applications and remote transactions over computer networks. More specifically, the invention relates to strong authentication tokens that are adapted to acoustically receive input data.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

In the past, application providers have relied on static passwords to provide the security for remote applications. In recent years it has become evident that static passwords are not sufficient and that more advanced security technology is required.

One way of solving the security problems associated with remote access to computer systems and applications over public networks is provided by a Public Key Infrastructure (PKI). Using a Public Key Infrastructure one associates a public-private key pair with each user. The key pair is associated with a certificate (issued by a trustworthy Certificate Authority) that binds that public-private key pair to a specific user. By means of asymmetric cryptography this public-private key pair can be used to authenticate the user, sign transactions, and set-up encrypted communications.

To guarantee an adequate level of security it is mandatory that each user's private key remains secret and can only be accessed to create a signature or to decrypt a message by the legitimate user associated with that key. It is common to rely on a smart card or a dedicated Universal Serial Bus (USB) device (sometimes referred to as a USB key or a USB token) to store the public-private key pair and the certificate and to carry out the cryptographic calculations involving the private key.

There are some disadvantages associated with PKI and the smart cards carrying the PKI keys and certificates:
1. Building a Public Key Infrastructure is generally complicated and therefore expensive when compared to competing security technologies.
2. PKI is inherently limited to environments and applications where there is a digital connection between clients and servers, because PKI cryptograms and signatures are bulky and not easily transformed into human-readable form. In other words it is unsuitable for telephone banking or other delivery channels where it is not possible to provide a digital connection between the container of the PKI certificate and private key on the one hand and an application server on the other hand.
3. PKI smart cards and USB tokens do not have a built-in power supply or a user interface. PKI smart cards and USB tokens therefore rely on the presence of an interfacing system that provides electrical power to the card, that is capable of digitally exchanging data with the card, and that is capable of interacting with the user (e.g. capturing the card's personal identification number (PIN) and presenting the data that should be signed). USB tokens are usually plugged into a built-in USB port of a PC, where the USB port supplies power to the USB token and the human interface devices connected to the PC provide the user interaction capabilities (connected USB token model). PKI smart cards are usually operated by means of a PC equipped with a simple smart card reader, where the reader only supplies power to the smart card and enables communication between an application on the PC and the inserted smart card, and whereby the human interface devices connected to the PC provide the user interaction capabilities. Such a reader, which has no trustworthy user interface of its own, is often referred to as transparent card reader. These typical usage models reduce the mobility of the user, as most PCs are not pre-equipped with smart card readers, and ad-hoc installation of drivers for the readers of USB tokens proves too cumbersome. It also presents a security problem: all user interaction (such as approving a signature or capturing the card's PIN) is done on the inherently insecure PC.

Another approach consists of adding software applications offering security functions to general purpose devices such as a user's PC, or mobile device (e.g., mobile phone or PDA). The main problem associated with this approach is that general purpose devices have an inherently open architecture which makes them susceptible to all kinds of malicious software such as viruses and Trojans that could present fake messages to the user, or capture whatever the user enters on the keypad, or read in memory sensitive data associated with a security application, or alter data before they are being signed. Therefore general purpose devices cannot be considered to have a trustworthy user interface and don't have secure means to store secrets such as PIN values and cryptographic keys. Furthermore, known solutions for mobile devices rely on wireless subscriber networks for the reception and/or transmission of transaction data. Such networks have inherent security and end point authentication mechanisms in place, which cannot be assumed to be present when the Internet is used for all transmissions.

An alternative technology for authentication and transaction signature capabilities, which avoids the security issues of solutions based on general purpose devices and the security, installation and interconnection problems of PKI smart cards and USB tokens, is offered by 'strong authentication token devices'. Typical examples of strong authentication tokens are the products of the DIGIPASS® line, commercialized by Vasco Data Security Inc. of Chicago, Ill. (see the website http://www.vasco.com). A strong authentication token is an autonomous battery-powered device, dedicated to providing authentication and/or transaction signature functions, usually pocket-size, with its own display and keypad. In some cases the keypad is reduced to a single button or even completely omitted, in other cases the keypad can be a full keyboard. The display and keypad of a typical strong authentication token are non-removable and not user-serviceable, fully controlled by the token, and immune for interference by malicious software on a host computer. Therefore strong authentication tokens are considered to have a trustworthy user interface in contrast to, for example, PCs where there is always the possibility that malicious software such as a virus or a Trojan presents fake messages to the user, or captures whatever the user enters on the keypad, or reads in memory sensitive data associated with a security application or alters data before they are being signed. The main purpose of a strong authentication token is to generate dynamic security values which are usually referred to as 'One-Time Passwords' (OTPs) or dynamic passwords. Typically these OTPs are generated by cryptographically combining a secret that is shared between the token and a verification server with a dynamic value such as a time value, a counter value or a server challenge that is provided to the token, or a combination of these. Some strong authentication tokens can also use data (such as transaction data) that have been provided to the token as dynamic value or in combination with any of the dynamic values mentioned above to generate a security value. In these cases the resulting security value is meant to indicate the user's approval of the data and the security value is usually referred to as an electronic signature or Message Authentication Code (MAC). Some strong authentication tokens consist of a device with a display and a keypad that is capable of communicating with an inserted smart card whereby the generation of the OTPs or MACs is partly done by the device itself and partly by the inserted smart card.

A typical way to provide data to a strong authentication token is by letting the user enter the data manually on the token's keypad. When the amount of data that has to be entered in this way exceeds a few dozen characters, the process is often perceived by users as too cumbersome. Another disadvantage is that tokens that support manual data input usually have a keypad which usually makes the token considerably larger than it could be if no such keypad were present. To relieve the user, solutions have been devised whereby the input of data doesn't require the manual entry of said data by the user on the token's keypad. One example are solutions whereby the token includes receiving means to receive data sent over an out-of-band channel such as for example a radio network or mobile telephony network (see U.S. Pat. No. 5,668,876 issued on Sep. 16, 1997). The disadvantage of such out-of-band solutions is the extra complexity and cost associated with supporting the technology of said out-of-band channel, and the dependence on the availability and the cost of usage of said out-of-band channel. Another solution consists of tokens that allow for data input by means of an optical interface, whereby the user holds the token close to a computer screen that displays a varying optical pattern. Examples of such optical tokens are Digipass 700 and Digipass 300 offered by VASCO Data Security Inc. of Chicago, Ill. and the tokens described in European Patent Specification Number 1211841 published Jun. 5, 2002, European Patent Specification Number 1788509 published May 23, 2007, U.S. Pat. No. 5,136,644 issued on Aug. 4, 1992.

A general problem of tokens with an optical data input interface is that relatively expensive components are required to build an interface that can take in data at a high data rate. This is a consequence of the requirement to work reliably in a very broad range of computer screen qualities and environmental lighting conditions, combined with the relatively low refresh rates of typical computer screens. Another, more cost-effective, alternative is to use a low-speed optical interface. The disadvantage of a low-speed optical interface is that either it limits the transaction data that are effectively submitted to the token to a small number of values, or that the transmission time is inconveniently high.

What is needed is an alternative cost-effective data input mechanism for strong authentication tokens that allows reliable input of data at relatively high data rates and that is convenient for the user.

DISCLOSURE OF THE INVENTION

The present invention is based on the insight by the inventors that many applications that are secured by means of strong authentication tokens are accessed by the applications' users by means of a PC (personal computer) or similar computing device most of which have the capability of generating and emitting sounds in the human audible frequency range with a bandwidth that is typically in the order of 10 kilohertz, and that by judiciously modulating sound output by these computing devices it is possible to transmit data at a relatively high data rate to a strong authentication token equipped with means to receive and demodulate the sound thus emitted by these computing devices. The present invention is further based on the insight by the inventors that in such a set-up (i.e. whereby data is exchanged by sound waves in the human audible frequency range, data is transmitted by an audio speaker, data is received by an audio microphone, the transmission medium is the air between speaker and microphone, the medium/room has a certain reverberation and there is usually some amount of background noise in the room) a major source of transmission errors is due to reflections (e.g. at the walls of the room where the transmission takes place) of the sound signal which arrive at the token's receiver with a significant delay, i.e. giving rise to multipath reception of the acoustical signal, and that typically the power of a reflected signal will be smaller than the power of a directly received signal. Other significant sources of transmission errors may include background noises. It is a further insight by the inventors that typically the power of background noises will be stochastically spread over a relatively wide bandwidth. The present invention is furthermore based on the insight by the inventors that non-linear distortion of the acoustic signal, giving rise to harmonics of the frequencies present in the signal, in general does not contribute significantly to the power of the noise on the received signal.

In a typical embodiment the input data for the token is transmitted as modulated sound that is emitted and input to the token by means of an acoustical interface. In one embodiment the token's acoustical interface includes a microphone and a demodulation circuit. The microphone is for receiving an acoustical signal and for converting the acoustical signal into an analog electrical signal. The microphone is connected to a demodulation circuit which converts the analog electrical signal into a digital signal. In one embodiment the demodulation circuit is connected to a data processing means which is adapted to extract and treat input data coded in the digital signal.

In one embodiment the sending side includes a computing device with which the user interacts (e.g. to access an internet based application). In some embodiments the user's computing device may include a Personal Computer (PC), or a Tablet Computer, or a Smartphone, or some other similar computing device with which the user interacts (e.g. to access an internet based application). In some embodiments the user's computing device is equipped with speakers capable of emitting sounds in the human audible frequency range. In a particular embodiment the speakers of the user's computing device emit the sound output of a software application running on the PC. In one embodiment the software application running on the user's computing device includes a browser running an applet or plug-in embedded in a web page. In one embodiment the applet includes a flash application. In some embodiments the web page is associated with the application to be secured by the strong authentication token.

In some embodiments the receiving token includes a microphone to receive the acoustic signal and to transform it into an electrical signal. The token may also include a demodulation circuit connected to the microphone to demodulate the microphone's electrical signal.

In some embodiments the input data are encoded at the sending side as a digital data string. In some embodiments the digital data string is emitted as an acoustical signal using a frequency-shift keying (FSK) modulation scheme whereby each of the frequencies used to code the acoustical signal (in the remainder of the text referred to as 'coding frequencies') is an integer multiple of a common base frequency. Although in some embodiments the modulation is such that the acoustic signal being emitted at all times only contains one of the coding frequencies, because of noise, reflections and distortions the acoustical signal that is received by the token may contain several of the coding frequencies at the same time. In some embodiments the demodulation circuit detects the power of each coding frequency present in the signal and compares the relative power of each coding frequency. The coding frequency with the relatively strongest power is assumed to be the coding frequency emitted at the sending side.

In some embodiments the coding frequencies are each an integer multiple of a common base frequency and the demodulation circuit includes a phase-locked loop (PLL) tuned to the common base frequency of the coding frequencies. In some embodiments the PLL is a narrow-band PLL. Because it is tuned to the common base frequency of the coding frequencies it will also synchronize on each of the coding frequencies itself as well.

In some embodiments the demodulation circuit includes a pre-amplifying component for selectively amplifying the microphone's electrical signal prior to actual demodulation. In some embodiments the pre-amplifying component includes a band-pass filter which suppresses frequencies lower than the lowest coding frequency and suppresses frequencies higher than the higher coding frequency.

In some embodiments the demodulation circuit includes for each supported coding frequency a power detection sub-circuit. Each power detection sub-circuit outputs an electrical signal the level of which is indicative of the power in the received acoustical signal of the coding frequency associated with that power detection sub-circuit. The power detection sub-circuits may be connected to a ratio-detector sub-circuit which compares the output levels of the power detection sub-circuits and which outputs a signal that indicates which power detection sub-circuit has the most extreme output level and hence which coding frequency has the highest power in the received acoustical signal. In some embodiments only two coding frequencies are being used and the output signal of the ratio-detector sub-circuit is a sequence of bits with '0' indicating that one coding frequency has most power and '1' indicating that the other coding frequency has most power. In some particular embodiments the ratio-detector sub-circuit may include a comparator with as inputs the outputs of two power detection sub-circuits.

In some embodiments the power detection sub-circuits include a demodulator component and a low-pass filter whereby the demodulator component's output is the input to the low-pass filter and whereby each demodulator component takes as input the received input signal (optionally conditioned by selective amplification) and a reference signal generated by the phase-locked loop.

In some embodiments the token may have additional data input mechanisms besides the acoustical input interface to receive input data. Said additional data input mechanisms may include a manual user input interface allowing the user to manually enter data into the token. This manual user input interface may include a keypad or a keyboard. It may also include alternative mechanisms to manually enter data such as joysticks, jog dials, track balls, turn wheels, or similar devices. The additional input interfaces may also include communication mechanisms and protocols such as electrical personal area networks such as USB or Firewire, or optical connections, or wireless personal area networks using radio transmission such as Bluetooth or infrared transmission such as IRDA (Infrared data association).

In some embodiments the token has no keypad resulting in a compact design. In other embodiments the token has a compact manual user input interface adapted to allow a user to manually enter input data such as a PIN. The compact user input interface may comprise a keypad with no more than three or four keys, or a wheel to scroll through a set of options (such as a list of digits) in combination with no more than two buttons, or even only a wheel to scroll through a set of options whereby the wheel can also function as a push button to confirm the currently selected option. In some embodiments the compact manual user input interface may consist of a navigation mechanism and a confirmation mechanism, whereby the navigation mechanism permits the user navigation through a list of options and/or selection of an item of a list of options, and the confirmation mechanism permits the user to give a confirmation to the token e.g. to confirm a currently selected item such as an option or data element or to confirm information presented by the token to the user or to confirm a suggestion by the token. In some embodiments the compact manual user input interface may also comprise a cancelation mechanism that permits the user to indicate to the token that the user disapproves or cancels something presented to the user. In some embodiments the navigation mechanism comprises a turn wheel or a jog dial. In some embodiments the navigation mechanism may comprise one, two or more than two navigation buttons. In some embodiments the confirmation mechanism may comprise an OK button. In some embodiments the cancelation mechanism may comprise a cancel button. In some embodiments the data input means of the token may consist of only an acoustical input interface and a compact manual user input interface.

In one set of embodiments of the invention the token includes a keypad. In one embodiment this keypad allows entry of at least the decimal digits. In another embodiment said keypad also allows entry of hexadecimal digits or alpha-numerical characters. In some embodiments said keypad includes control buttons to indicate user approval or rejection of information or options presented by the token, or navigation buttons to navigate through menu options or through information presented by the token. In other embodiments said keypad includes a full keyboard. In some embodiments, both a keypad and an optical interface may be present besides the acoustical input interface, where the keypad could serve as a back-up input means in case the optical and/or acoustical input means fail.

In some embodiments the manual user input interface is adapted to permit the user to indicate approval of, e.g. data to be signed, or to indicate preferences such as whether an optical or acoustical interface should be used to receive input data. In some embodiments the manual user input interface is adapted to permit the user to provide values to the token. These values may include transaction data to be signed or a PIN value.

In some embodiments the token includes a user output interface by means of which the token can output or present information to the user. In some embodiments the information output to the user may include security values such as one-time or dynamic passwords and/or signatures on e.g. transaction related data. In some embodiments the information presented to the user may include data to be signed by the token for prior approval by the user. In some embodiments the information presented to the user may include information about the data to be signed such as the meaning of certain data elements or information about a transaction context such as a reference or name to an application owner.

In some embodiments of the invention the token's output means include a display such as for example a Liquid Crystal Display (LCD) and/or one or more Light Emitting Diodes (LEDs) for example to indicate certain security statuses or conditions. In one embodiment the token can display texts on the display. In an embodiment said texts can be displayed as a sequence of characters. On another embodiment the token can display icons or pictograms on the display. In some other embodiment the token's output means include audio output means such as for example a loudspeaker, earphones, or means to attach such loudspeaker or headphones such as for example a ⅛" audio socket or an RCA audio socket, to convey information to the user by means of generated sounds. In one embodiment the generated sounds are sequences of tones. In another embodiment the generated sounds consist of synthesized speech. In another embodiment the generated sounds are reproductions of stored sound fragments.

In some embodiments the token may have been adapted to have a trustworthy user input interface. In some embodiments this includes the token's input interface being adapted so that the token can always distinguish between data manually input by a user physically interacting with the token and data that is provided to the token but that is not manually entered by some user physically interacting with the token. In some embodiments the manual user input interface may be non-removable and not user-serviceable, fully controlled by the token, and immune for interference by malicious software on a host computer. In some embodiments the token may be adapted to resist unauthorised changes to the token firmware. In some embodiments the token's firmware may be stored in unalterable memory such as ROM. In some embodiments the token supports firmware updates but the firmware can only be updated by means of cryptographically protected secure firmware update protocols. In some embodiments the token may have tamper resistance and/or tamper detection mechanisms which may include mechanisms to detect opening of the token's housing.

In some embodiments the token may have been adapted to have a trustworthy user output interface. In some embodiments this includes the token's user output interface being adapted so that the token fully controls any output the token presents to the user. In some embodiments the user output interface may be non-removable and not user-serviceable, fully controlled by the token, and immune for interference by malicious software on a host computer. In some embodiments the token may be adapted to resist unauthorised changes to the token firmware. In some embodiments the token's firmware may be stored in unalterable memory such as ROM. In some embodiments the token supports firmware updates but the firmware can only be updated by means of cryptographically protected secure firmware update protocols. In some embodiments the token may have tamper resistance and/or tamper detection mechanisms which may include mechanisms to detect opening of the token's housing.

In a particular embodiment of the invention the token includes data processing means such as a microprocessor to perform cryptographic operations and data storage means such as RAM, ROM or EEPROM memory to store one or more secret values such as one or more PIN values or cryptographic secret keys. In some embodiments the token is adapted to prevent unauthorized reading of these secret values. For example the token may have tamper resistance and/or tamper detection mechanisms which may include mechanisms to detect opening of the token's housing.

In one embodiment of the invention the input data can include a challenge (e.g., a random number or hash of transaction data that may be processed for authentication/validation purposes). In another embodiment of the invention the input data includes transaction related data including transaction values or transaction context information. In some embodiments the transaction context information may include transaction data labels and/or information regarding the meaning of the transaction related data. In some embodiments the input data includes application flow related information. In some embodiments the application flow related information may include information regarding the type of transaction. In some embodiments the application flow related information may guide the token with respect to the way that the token should handle the received transaction related data and/or how the token should handle the user interaction flow, for example which data should be presented to the user for review and/or approval and whether the user should be asked or given the opportunity to correct data or manually provide extra data and/or which messages should be presented to the user.

In some embodiments the input data may include a server credential that has been cryptographically generated by a server. In some embodiments the server has generated the server credential using a symmetric cryptographic and secret key that is shared with the token or a second security device that the token communicates with. In some embodiments the token is adapted to verify the server credential. In some embodiments the token is adapted to verify the server credential in cooperation with a second security device. In some embodiments the verification of the server credential is done using a symmetric cryptographic algorithm that uses a secret key shared with the server. In some embodiments the server credential comprises a server one-time password. In some embodiments the server credential comprises a data signature. In some embodiments the server credential comprises a Message Authentication Code (MAC). In some embodiments the server credential comprises encrypted input data. In some embodiments the purpose of the server credential is to authenticate a server or server application. In some embodiments the purpose of the server credential is to authenticate input data received by the token from a server. In some embodiments the purpose of the server credential is to protect the integrity of input data received by the token from a server. In some embodiments the purpose of the server credential is to protect the confidentiality of input data received by the token from a server. In some embodiments the generation of dynamic security credentials by the token may be conditional on successful verification of the server credential.

In one particular embodiment the input data are encoded as a binary data string including a sequence of bits. The binary data string is emitted as an acoustical signal using two coding frequencies, one coding frequency being the double of the other frequency.

Generation of Dynamic Security Values.

In some embodiments the token is adapted to generate dynamic security values. In some embodiments the generated dynamic security values may comprise one-time or dynamic passwords, and/or responses to challenges and/or electronic signatures on transaction data. In some embodiments the token is adapted to present generated dynamic security values to the user. In some embodiments the dynamic security values are generated by cryptographically combining at least one secret value (such as a cryptographic key) with at least one dynamic value (such as a time value and/or a counter value and/or a challenge and/or transaction related data). In some embodiments the cryptographically combining comprises performing a cryptographic algorithm. In some embodiments the cryptographic algorithm may comprise a symmetric encryption or decryption algorithm such as DES, 3DES or AES. In some embodiments the cryptographic algorithm may comprise a hashing or keyed hashing algorithm such as SHA-1.

In some embodiments the token comprises a data processing component that is adapted to perform a cryptographic algorithm that is used in the generation by the token of dynamic security values. In some embodiments the token comprises a memory component for storing one or more cryptographic secrets that are used in the generation by the token of dynamic security values. In some embodiments the stored cryptographic secrets are symmetric keys shared with an authentication server. In some embodiments the stored cryptographic secrets are stored in the token in a non-volatile memory and used for multiple generations of dynamic security values. In some embodiments the stored cryptographic secrets are used for only one generation of a dynamic security value and may in some embodiments be stored in volatile memory and/or actively erased from memory after the dynamic security value has been generated.

In some embodiments the token is adapted to communicate with a second security device and the dynamic security values are generated by the token in conjunction or cooperation with that second security device. In some embodiments the token is adapted to send a command to the second security device, to receive a response from the second security device and to derive a dynamic security value from that response. In some embodiments the second security device stores a secret key and the token instructs the second security device to use that secret key in a cryptographic calculation and to return a result of that cryptographic calculation to the token. In some embodiments the second security device cryptographically combines the secret key that it stores with one or more data elements that it has received from the token such as for example a challenge or transaction data. In some embodiments the second security device cryptographically combines the secret key that it stores with one or more data elements that it stores and maintains internally such as for example a counter. In some embodiments the token uses the response of the second security device to derive a secret key that it cryptographically combines with a dynamic variable to generate a dynamic security value. In some embodiments the dynamic variable may be derived from data input (such as for example a challenge or one or more transaction related data elements) into the token through the acoustical input interface of the token. In some embodiments the second security device comprises a smart card. In some embodiment the smart card comprises a financial smart card that is compliant with the Europay, MasterCard, Visa (EMV) standard and the token is adapted to communicate with EMV compliant smart cards.

PIN Handling.

In some embodiments the token is adapted to receive a PIN value provided by the user. In some embodiments the token is adapted to pass on a PIN value provided by the user to a second security device (such as a smart card) for verification. In some embodiments the token is adapted to remove from its memory any copy in any format of such a PIN value once that PIN value has been verified. In some embodiments the token has been adapted to actively erase or overwrite the memory locations where such a PIN value has been temporarily stored after the PIN value has been verified.

Co-Existence in the Same Token of an Acoustical and an Optical Input Interface.

In some embodiments the application on the user's computing device (which may include e.g. a PC, a Tablet computer or a Smartphone) emits an acoustical signal that encodes input data destined to be received by the user's token. In some embodiments the user's computing device has a display that displays optically encoded input data destined to be received by the user's token. The optically encoded data may, for example, be encoded in a flashing pattern. In some embodiments the user's computing device both emits an acoustical signal that encodes input data destined to be received by the user's token and it has a display that displays a flashing pattern that also encodes input data destined to be received by the user's token. In some embodiments the data that the user's computing device emits acoustically and the data that it encodes optically encode substantially the same information. In some embodiments the data that the user's computing device emits acoustically is different from the data that it encodes optically. In some embodiments the data that the user's computing device emits acoustically is complementary to the data that it encodes optically.

In some embodiments the token has both an acoustical and an optical input interface and may optionally also have a manual user input interface.

In some embodiments the token is adapted to receive from the user an indication whether the token should receive input data via its optical input interface of via its acoustical input interface. In some embodiments when the user has indicated that the optical input interface should be used to input data the token enables the optical input interface and may disable the acoustical input interface. In some embodiments when the user has indicated that the acoustical input interface should be used to input data the token enables the acoustical input interface and may disable the optical input interface.

In some embodiments the acoustical and optical input interface may be both enabled at the same time. In some embodiments the acoustical and optical input interface are both enabled by default. In some embodiments, when the acoustical and optical input interface are both enabled at the same time, the token is adapted to receive data concurrently through both the acoustical and optical input interface. In some embodiments the token is adapted to assemble or combine the data that it received through the optical input interface with the data that it received through the acoustical input interface. For example, if a message to be received by the token consists of multiple data blocks, the token may receive some data blocks of the message through the optical input interface and other data blocks of the message through the acoustical input interface and the token may combine these data blocks to assemble the full message. This may for example be the case when the user's computing device sends the same message via the acoustical and the optical input interfaces but due to transmission errors in both the optical and the acoustical channel some data blocks may not have been correctly received via the acoustical input interface while other data blocks may not have been correctly received via the optical input interface. In some embodiments the token is adapted to receive data through both the acoustical and optical input interfaces concurrently and to assume that the same message is sent through both the acoustical and optical input interfaces. In some embodiments the token is adapted to receive data through both the acoustical and optical input interfaces concurrently and to consider message reception successful as soon as it has successfully received a message via either of the optical or acoustical input interface.

In some embodiments the token is adapted to select one of the optical or acoustical input interfaces to receive data without receiving an indication of the user.

In some embodiments the token comprises an input interface selection mechanism to select one of the optical or acoustical input interfaces. In some embodiments the input interface selection mechanism may be implemented using a data processing component such as a microprocessor or a logical circuit.

In some embodiments the input interface selection mechanism decides by means of heuristic rules on the basis of certain characteristics of the signals received through the acoustic and optical input interfaces which input interface is preferred to receive data. In some embodiments the token analyses the signals of both the acoustical and optical input interface concurrently and based on the outcome of this analysis decides whether to perform further processing on the signal of either the optical or the acoustical input interface to try to demodulate data and receive a message. In some embodiments this analysis comprises analysing the energy and/or the frequency content of the optical and/or acoustical signals. In some embodiments the analysis comprises comparing the energy in a specific frequency range of the received signal to a reference value.

In some embodiments the token is adapted to select one of the optical or acoustical input interfaces to receive data in the following way. Initially the token tries for a certain period (for example a second or even less than a second) to receive at least some data through a first one of the optical or input acoustical interface. If that is successful then the token selects this input interface and continues receiving data through the selected input interface. If it fails then the token repeats the selection process with the other input interface. This selection process may continue until the token is successful in receiving data through one of the input interfaces.

In some embodiments the token is adapted to detect transmission problems when it is receiving data through the selected input interface. In some embodiments the token may be adapted, in case of transmission problems with the selected input interface, to return to the interface selection phase. In some embodiments the decision to return to the interface selection phase may depend on pre-defined criteria. In some embodiments these pre-defined criteria may take into account characteristics of the detected transmission errors. In some embodiments the token may for example decide to return to the interface selection phase when a predefined threshold of the number of transmission errors per time unit has been exceeded.

In accordance with one aspect of the present invention, a strong authentication token generates dynamic security values by receiving an acoustical signal from a remote computer system at the authentication token, obtaining the input data by demodulating the acoustic signal; and generating the dynamic security value at the authentication token by recovering input data from the acoustical signal and processing the recovered input data. The authentication token may include a communication interface for communicating with a removable security device and the generating step may include generating the dynamic security value with the authentication token in cooperation with the removable security device. The method may additionally include receiving an optical signal including additional input data and the generating step may include combining the recovered input data and the additional input data.

Yet another aspect of the invention comprises a method to secure a remote server-based application being accessed by a user through a computing device communicating with the application server e.g. over the internet. The method may comprise the following steps.

Making available to a user an authentication token comprising an acoustical input interface. The authentication token may be one of the authentication tokens described in any of the preceding paragraphs. In some embodiments also a second security device such as a smart card is made available to the user to be used in conjunction with the authentication token to generate a dynamic security value.

Assembling input data to be input into said authentication token. These input data may comprise for example a challenge, or transaction related data, or transaction context related data. In some embodiments the input data may comprise a server credential. To obtain the server credential the server may optionally first generate a server credential. The server may generate the server credential using a secret key and a cryptographic algorithm. The cryptographic algorithm may be a symmetric cryptographic algorithm. In some embodiments the secret key for generating the server credential may be shared with the user's authentication token.

Sending the input data to the user's computing device. The user's computing device may be running a computer application such as a web browser. The input data may be embedded in one or more web pages that the server-based application serves to the computing device's browser.

Emitting at the user's computing device a modulated acoustical signal encoding for the input data to be received and demodulated by the authentication token for the authentication token to recover the input data. The authentication token may receive and demodulate the acoustical signal and recover the input data from the demodulated acoustical signal as described in the preceding paragraphs. In some embodiments also an optical signal may be emitted at the user's computing device. In some embodiments the optical signal may encode data comprising part or all of the input data.

Receiving from the user a dynamic security value that has been generated by the authentication token. The authentication token may generate the dynamic security value as described in the preceding paragraphs. In some embodiments the authentication token comprises a communication interface to communicate with a removable second security device and the authentication token generates the dynamic security value in cooperation with the removable second security device. In some embodiments the authentication token processes the input data to generate a dynamic security value. In some embodiments the dynamic security value is generated by cryptographically combining a dynamic variable with a secret key. In some embodiments the cryptographically combining comprises using of a symmetric cryptographic algorithm. In some embodiments the dynamic variable comprises a challenge. In some embodiments the dynamic variable comprises transaction related data. In some embodiments the dynamic variable comprises a time related value. In some embodiments the dynamic variable comprises a counter. In some embodiments the dynamic variable comprises a data element comprised in the input data received from the server-based application. In some embodiments the dynamic security value is generated using a key that is shared with the server-based application. In some embodiments the input data comprises a server credential and the authentication token verifies the server credential prior to generating the dynamic security value. In some embodiments the authentication token uses a symmetric cryptographic algorithm with a secret key that is shared with the application server to verify the server credential. In some embodiments the authentication token generates the dynamic security value on condition that verification of the server credential was successful. In some embodiments the authentication token comprises a secure user output interface and uses that secure user output interface to output the dynamic security value to the user. In some embodiments the user receives the dynamic security value and enters the dynamic security value on a web page related to the server-based application.

Verifying the received dynamic security value. The application server may verify the received dynamic security value using a cryptographic algorithm. In some embodiments the application server cryptographically combines a reference dynamic variable with a reference secret key to verify the received dynamic security value. In some embodiments the application server generates a reference security value and compares the reference security value with the received dynamic security value. In some embodiments the application server computes the reference security value by cryptographically combining a reference dynamic variable with a reference secret key. In some embodiments the cryptographically combining comprises performing a symmetric cryptographic algorithm. In some embodiments the secret key comprises a secret key that the application server shares with the authentication token or with a removable second security device the user's authentication token has cooperated with to generate the dynamic security value.

Taking appropriate action depending on the outcome of the verification of the dynamic security value. In some embodiments this may comprise that the user is granted access to the server-based application in case the verification was successful and is refused access in case the verification was not successful. In some embodiments this may comprise that a transaction request submitted by the user is performed if the verification was successful and is not performed if the verification was not successful.

In some embodiments the application server may comprise one or more server computers running one or more software applications. In some embodiments the application server may comprise one or more web servers. In some embodiments the application server may comprise one or more databases for storing data. In some embodiments the application server may use and/or store user related data. In some embodiments the application server may use and/or store data related to the authentication token. In some embodiments the data related to the user or the authentication token comprise one or more secret keys. In some embodiments one or more of these secret keys may be shared with the user's authentication token or with a removable second security device the user's authentication token has cooperated with to generate the dynamic security value.

Advantageous Effects

An important advantage of the present invention is that a strong authentication token equipped with an acoustic interface including a relatively small number of low-cost components can receive input data at a considerably higher rate than a strong authentication token equipped with an optical interface of similar cost.

Another advantage of the present invention is that a strong authentication token with an acoustical interface but without a keypad (or with a keypad with only a reduced set of keys) can still receive data input in a way that is convenient for the user while having considerably reduced dimensions in comparison to a token that is equipped with a keypad with a full set of at least numerical keys.

Another distinct advantage of the present invention is that a strong authentication token equipped with an acoustic interface including a demodulation circuit according to some of the embodiments of the invention allows for robust and reliable demodulation of an acoustic signal even in the presence of background noise and multi-path reception reflections.

BRIEF DESCRIPTION OF THE DRAWINGS

The foregoing and other features and advantages of the invention will be apparent from the following, more particular description of an embodiment of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
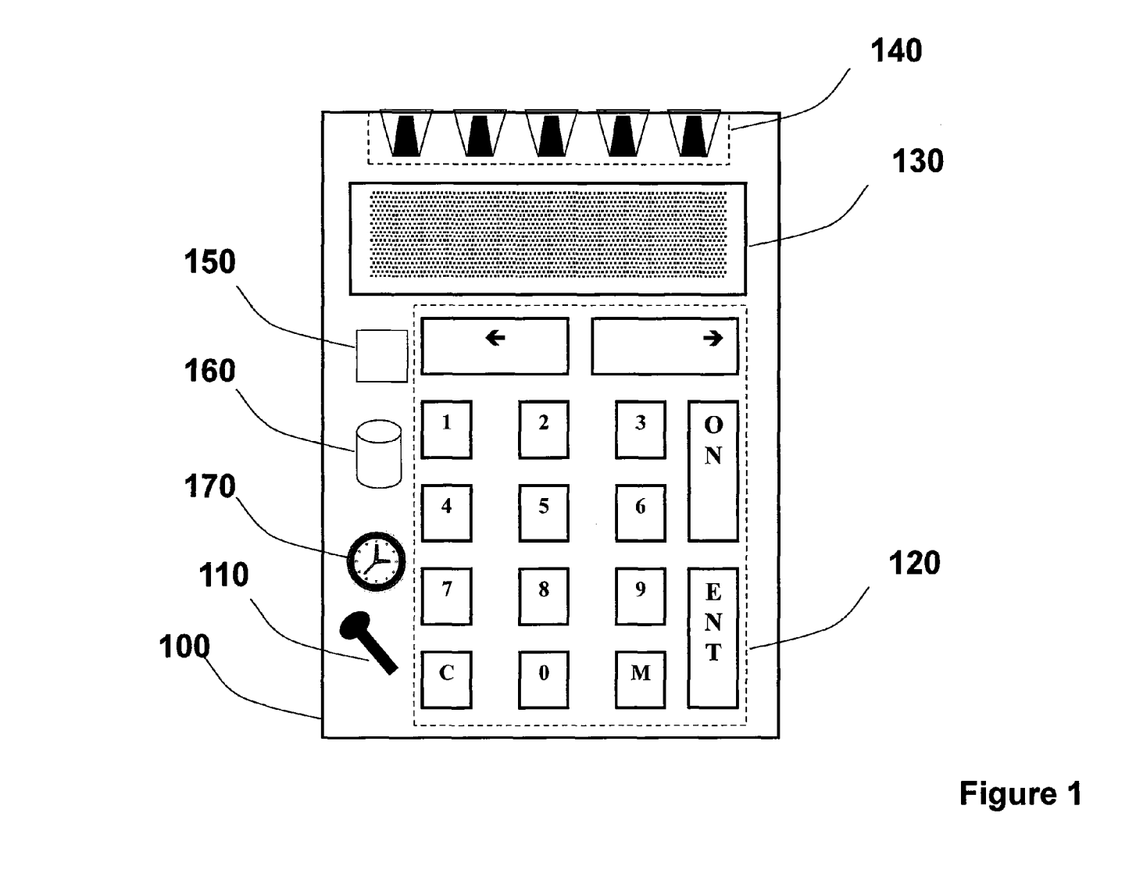
FIG. 1 illustrates a typical implementation of the invention.

FIG. 1 illustrates a typical implementation of the invention consisting of a token (100) for generating security values such as one-time passwords to authenticate a user or transaction signatures to indicate the user's approval of a transaction, including:

- an acoustical interface (110) for receiving acoustical signals transmitting input data for the token;
- a trustworthy output interface (130), such as for example a display or an audio output interface, to communicate information, such as said security values or transaction data to be approved, to the user;
- (optionally) one or more additional data input interfaces, such as a manual user data input interface (120) comprising for example a keypad and/or an optical data input interface (140) comprising for example one or more photosensitive elements such as an array of photosensitive elements, for receiving input data (which may include a challenge and/or transaction data) and/or to capture the user's approval of transaction data;
- a data processing component (150), such as a microprocessor, a controller, an FPGA (Field Programmable Gate Array) or an ASIC (Application Specific Integrated Circuit), capable of cryptographic operations, for generating security values (such as dynamic passwords and/or electronic signatures) and/or verifying server credentials, using secrets shared with a server;

a data storage component (160), such as a ROM, EEPROM, or battery-backed RAM, for storing configuration data and/or storing secrets which may include an access code to the token (e.g. a PIN) and/or secrets shared with a server and used for generating security values and/or verifying server credentials;

a clock (170) to provide a time value that can be used in the verification of a server credential or in the generation of a security value.

In some embodiments the keypad (120) may comprise less keys then the keys shown on FIG. 1. In some embodiments the keypad (120) may comprise more keys then the keys shown on FIG. 1.

In one embodiment the acoustical interface (110) includes a microphone and a demodulation circuit.

In some embodiments, the data processing component (150) implements an input interface selection mechanism to select either the optical (140) or the acoustical (110) input interface to receive input data.

Figure 2:
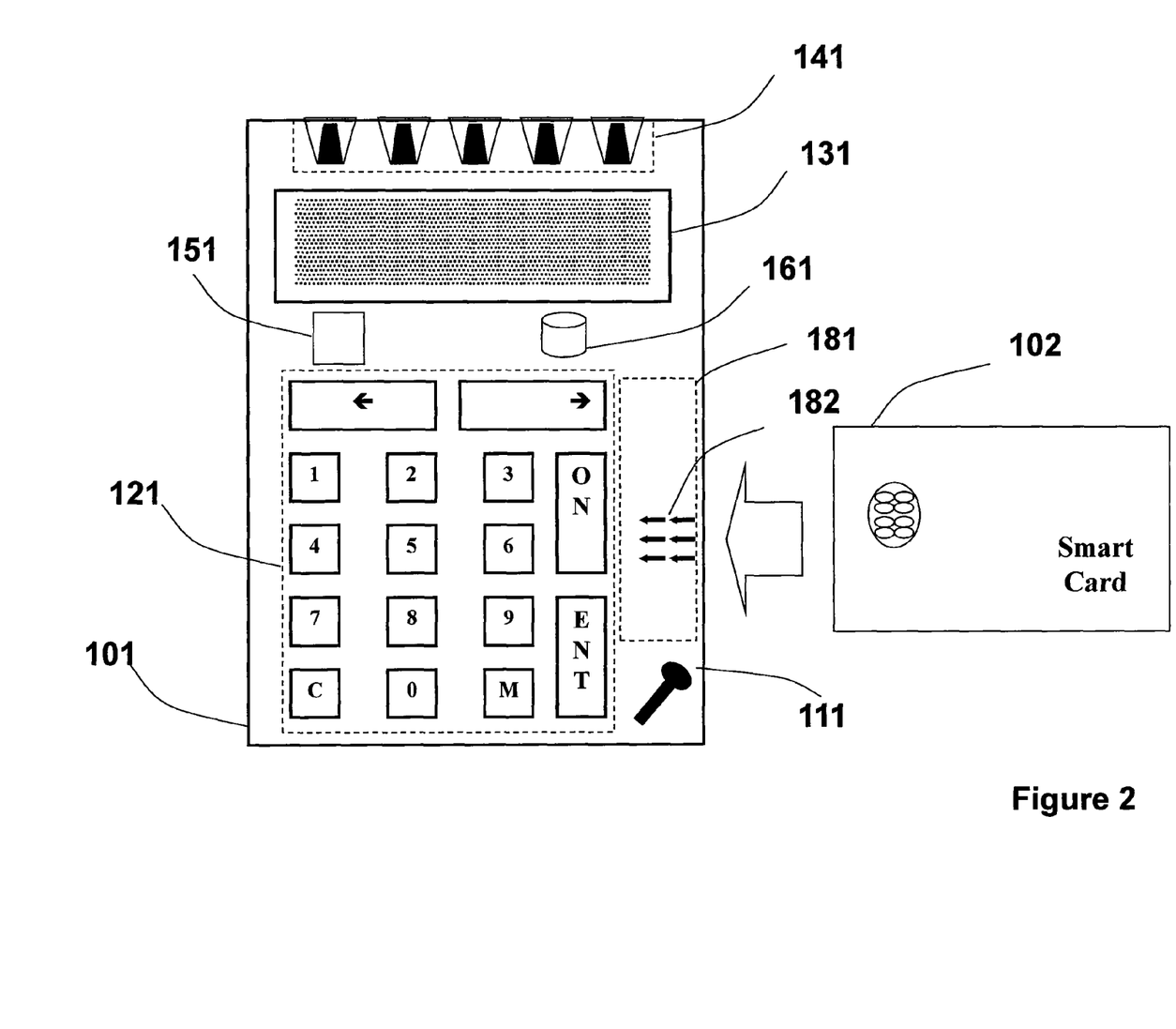
FIG. 2 schematically illustrates another typical implementation of the invention.

FIG. 2 schematically illustrates another typical implementation of the invention consisting of a first security device (101) for generating security values such as one-time passwords to authenticate a user or transaction signatures to indicate the user's approval of a transaction, and capable of communicating with a removable second security device (102), such as for example a smart card, to which for example some cryptographic operations can be delegated, including:

an acoustical interface (111) for receiving acoustical signals transmitting input data;

a trustworthy output interface (131), such as for example a display or an audio output interface, to communicate information, such as said security values or transaction data to be approved, to the user;

(optionally) additional data input interfaces, such as a manual user data input interface (121) comprising for example a keypad and/or an optical data input interface (141) comprising for example one or more photosensitive elements such as an array of photosensitive elements, for receiving input data (which may include a challenge and/or transaction data) and/or to capture the user's approval of transaction data;

a data processing component (151), such as a microprocessor, a controller, an FPGA (Field Programmable Gate Array) or an ASIC (Application Specific Integrated Circuit), that may be capable of cryptographic operations, for generating security values (such as dynamic passwords and/or electronic signatures) and/or verifying server credentials, whereby secrets maybe used that are shared with a server and whereby the generating and/or verifying may be done in cooperation with the removable security device;

a data storage component (161), such as a ROM, EEPROM, or battery-backed RAM, e.g. for storing configuration data and/or secrets which may include secrets shared with a server and used for generating security values and/or verifying server credentials;

an interface (181), including for example a smart card connector (182), to interact with a removable security device (102).

In some embodiments the keypad (121) may comprise less keys then the keys shown on FIG. 2. In some embodiments the keypad (121) may comprise more keys then the keys shown on FIG. 2.

In one embodiment the acoustical interface (111) includes a microphone and a demodulation circuit.

In some embodiments, the data processing component (151) implements an input interface selection mechanism to select either the optical (141) or the acoustical (111) input interface to receive input data.

In some embodiments the interface (181) comprises a data communication interface to exchange data with the removable security device. In some embodiments the removable security device (102) is a smart card and the data communication interface comprises a smart card reader for exchanging smart card commands and responses with the smart card. In some embodiments the removable security device (102) is adapted to generate a cryptogram and the data communication interface (181) of the first security device (101) is adapted to send a command to the second security device (102) to generate a cryptogram and to obtain from the second security device (102) the cryptogram generated in response to that command. In some embodiments the second security device (102) generates the cryptogram using a symmetric cryptographic algorithm and a secret key. In some embodiments the first security device (101) uses a cryptogram obtained from the second security device (102) when generating the security values. In some embodiments the first security device's (101) generating a security value comprises selecting bits from data obtained from the second security device (102). In some embodiments selecting bits from data obtained from the second security device (102) comprises selecting bits from a cryptogram generated by the second security device (102) and obtained by the first security device (101). In some embodiments the data processing component (151) is adapted to perform cryptographic operations when generating the security values, whereby the cryptographic operations involve a cryptographic key that is derived from data generated by the second security device (102) and obtained by the first security device (101). In some embodiments these cryptographic operations comprise generating a MAC (Message Authentication Code) over transaction data input into the first security device (101).

In some embodiments the first security device (101) is adapted to: communicate with a smart card (102), to send a smart card command to the smart card (102) instructing the smart card (102) to generate a cryptogram using a symmetric cryptographic algorithm with a secret key stored on the smart card (102) and a counter stored and maintained on the smart card (102), to receive from the smart card (102) that cryptogram generated by the smart card (102), to derive a symmetric key from that received cryptogram, to use that derived symmetric key to generate a MAC over a set of transaction related data, to transform the MAC into a dynamic security value and to present that dynamic security value to the user by means of output interface (131). In some embodiments the first security device (101) receives at least one of the set of transaction related data through the acoustical input interface (111).

Figure 3:
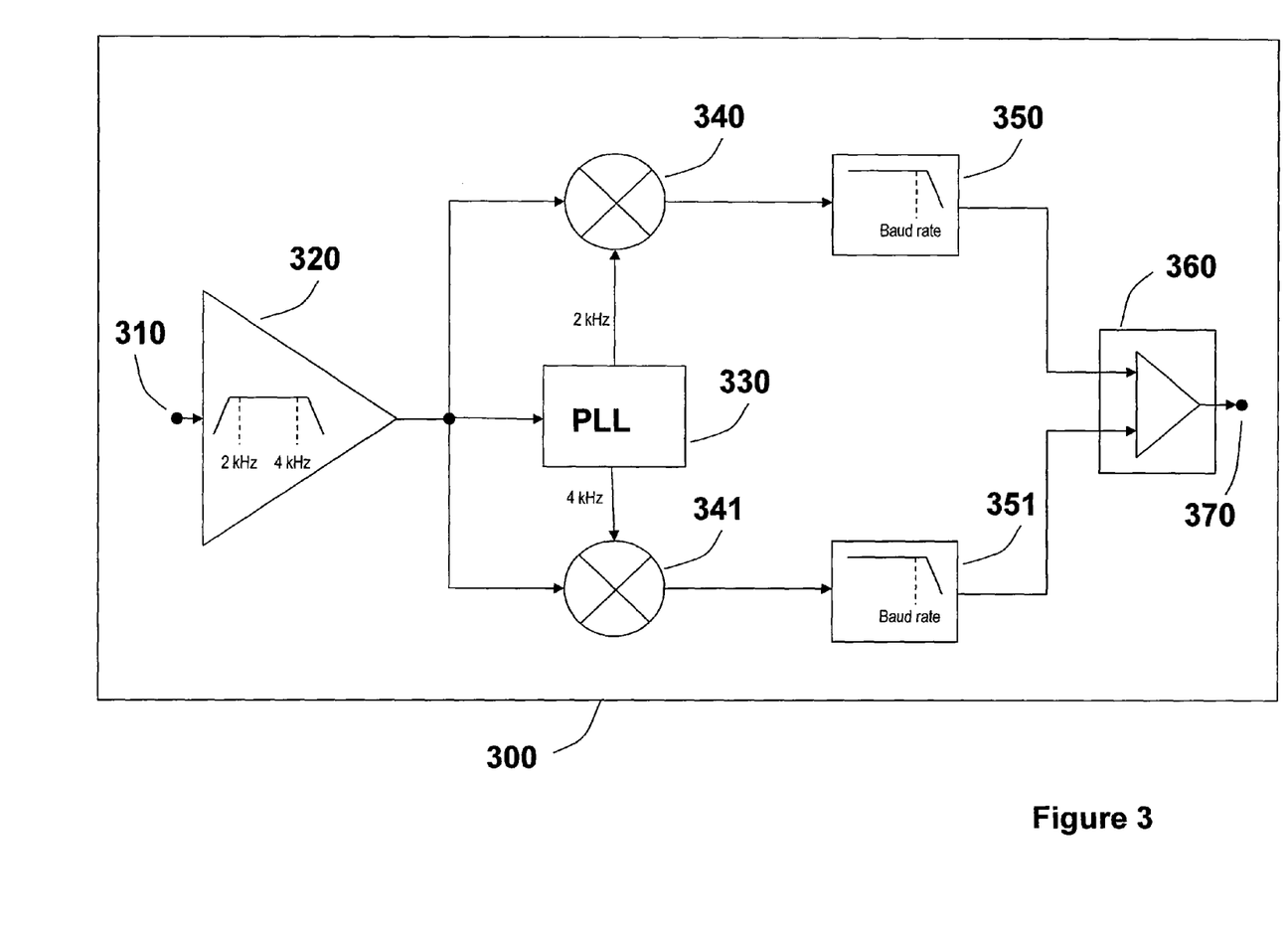
FIG. 3 schematically illustrates a demodulation circuit according to an aspect of the invention.

FIG. 3 schematically illustrates a demodulation circuit (300) according to an aspect of the invention.

In one embodiment an input node (310) of the demodulation circuit (300) is connected to a microphone that receives an acoustical signal. Optionally the demodulation circuit (300) includes a pre-amplifying component (320) which selectively amplifies the input signal at input node (310). The optionally selectively amplified input signal is fed to on the one hand the phase-locked loop (330) and on the other hand to each of the demodulator components (340 & 341). The phase-locked loop (330) is tuned to a base frequency and generates a number of reference signals. Each reference signal is at a specific frequency that is an exact integer multiple of the base frequency that the phase-locked loop (330) is synchronising to. The frequencies of the reference signals correspond to the coding frequencies that are assumed to have been used to modulate the acoustic input signal. The phase-locked loop (330) provides to each of the demodulator components (340 & 341) one of these reference signals. Each demodulator component (340, 341) combines the input signal with the reference signal it receives from the phase-locked loop (330) and outputs a signal with a low frequency component that is indicative of the power in the input signal at the frequency of the reference signal that the demodulator component (340, 341) receives from the phase-locked loop (330). The output signals of each demodulator component (340, 341) is filtered by a low pass filter (350, 351) and the output of each low-pass filter (350, 351) is fed to a ratio detector (360) which compares the signals of the low pass filters (350, 351) and outputs at output terminal (370) a digital signal that indicates at which coding frequency the input signal has the most power. Given that in general a directly received signal has higher power than a reflected (and delayed) signal, distortions of the input signal due to reflections will be efficiently suppressed. While in FIG. 3 only two sets of demodulator component and corresponding low-pass filter have been illustrated, it shall be clear that the number of demodulator components and corresponding low-pass filters, and thus the number of coding frequencies, can in some embodiments be larger.

In some embodiments a data processing component is connected to the output terminal (370) of the demodulation circuit (300) to further process the digital output signal and to recover and process the input data. In some embodiments the data processing component may include a microprocessor or a microcontroller or a field-programmable gate array (FPGA) or an application specific integrated circuit (ASIC).

In some embodiments the pre-amplifying component (320) includes a band-pass filter which suppresses frequencies lower than the lowest coding frequency and suppresses frequencies higher than the highest coding frequency. Given that any power in the input signal at frequencies outside this range can only be due to background noise, this contributes to cancellation of background noise. In some embodiments the pre-amplifying component (320) includes an auto-gain control functionality.

In some embodiments the cut-off frequency of the low-pass filters (350, 351) is more or less at the assumed baud rate of the input signal. In some particular embodiments the cut-off frequency of the low-pass filters (350, 351) is less than twice the assumed baud rate of the input signal.

In some embodiments the phase-locked loop (330) has a very small capture range. It works on a more or less fixed base frequency and only very small deviations are possible to ensure phase lock to that base frequency. It should be noted that the phase-locked loop (330) is also capable to lock on integer multiples of the base frequency.

In some embodiments the phase-locked loop includes a digital phase-locked loop. In some embodiments the phase-locked loop includes a numerical controlled oscillator.

In some embodiments the demodulator components include a synchronous AM (amplitude modulation) demodulator. In some embodiments the demodulator components include a product detector. In some embodiments each demodulator component effectively multiplies the input signal with the reference signal at frequency fx that it receives from the phase-locked loop (330). I.e. their output signal has a low-frequency component $f\_low=fx-fx=DC$ and a high frequency component $f\_high=fx+fx=2*fx$. The latter high frequency is removed or at least attenuated by the low pass filter connected to that demodulator component. As a consequence most of the background noise in the received input signal is minimized by this low pass filter. In some embodiments the demodulator components may include a conditional inverter. In some embodiments the demodulator components may include a double balanced mixer.

In some embodiments the lowest coding frequency is equal to the base frequency.

In other embodiments there are two coding frequencies.

In yet other embodiments the coding frequencies are integer multiples of the lowest coding frequency.

Figure 4:
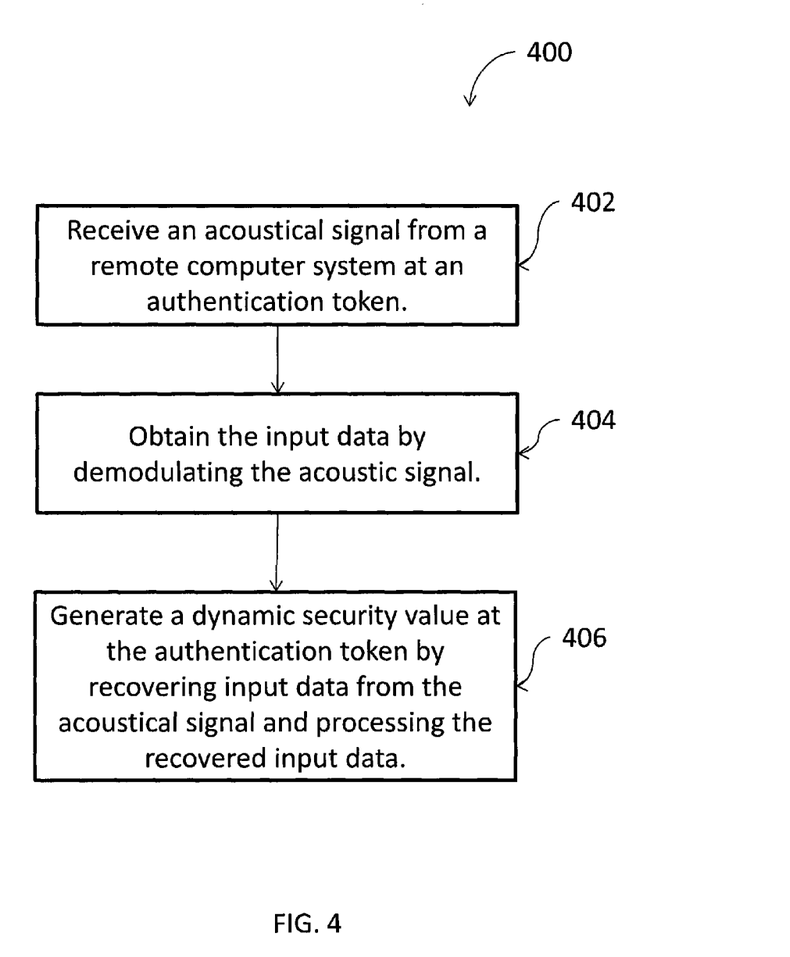
FIG. 4 is a flow chart depicting a strong authentication method for use with an authentication token according to an aspect of the present invention.

FIG. 4 depicts a flowchart 400 of steps for use with a strong authentication token (100/101) to generate strong security values. Although, the steps of flow chart 400 are described below with reference to the apparatus of FIGS. 1-3, it will be understood by one of skill in the art from the description herein that the method may be performed using other apparatus without departing from the scope of the present invention.

At block 402, an acoustical signal including input data is received from a remote computer system. The acoustical signal may be received at an authentication token 100/101 from a computer system such as a PC, a Tablet Computer, or a Smartphone, or some other computing/processing device with which the user interacts. The authentication token (100/101) may be one of the authentication tokens with an acoustical input interface (111) described in any of the preceding paragraphs. The input data may include data used for authentication/validation such as a challenge, transaction data, or server credentials.

At block 404, input data is obtained by demodulating the acoustic signal. The acoustical signal may be demodulated using demodulation circuit 300.

At block 404, the dynamic security values are generated. The dynamic security values may be generated at the authentication token (100/101) as described in any of the preceding paragraphs. The dynamic security value may be generated at the authentication token 100/101 by recovering input data from the demodulated acoustical signal and processing the recovered input data with data processing component 150/151. The authentication token 100/101 may include a communication interface (182) for communicating with a removable security device (102) such as a smart card and the generating step may include generating the dynamic security value with the authentication token (100/101) in cooperation with the removable security device (102). The authentication method may additionally include receiving an optical signal including additional input data and the generating step may include combining the recovered input data and the additional input data.

Figure 5:
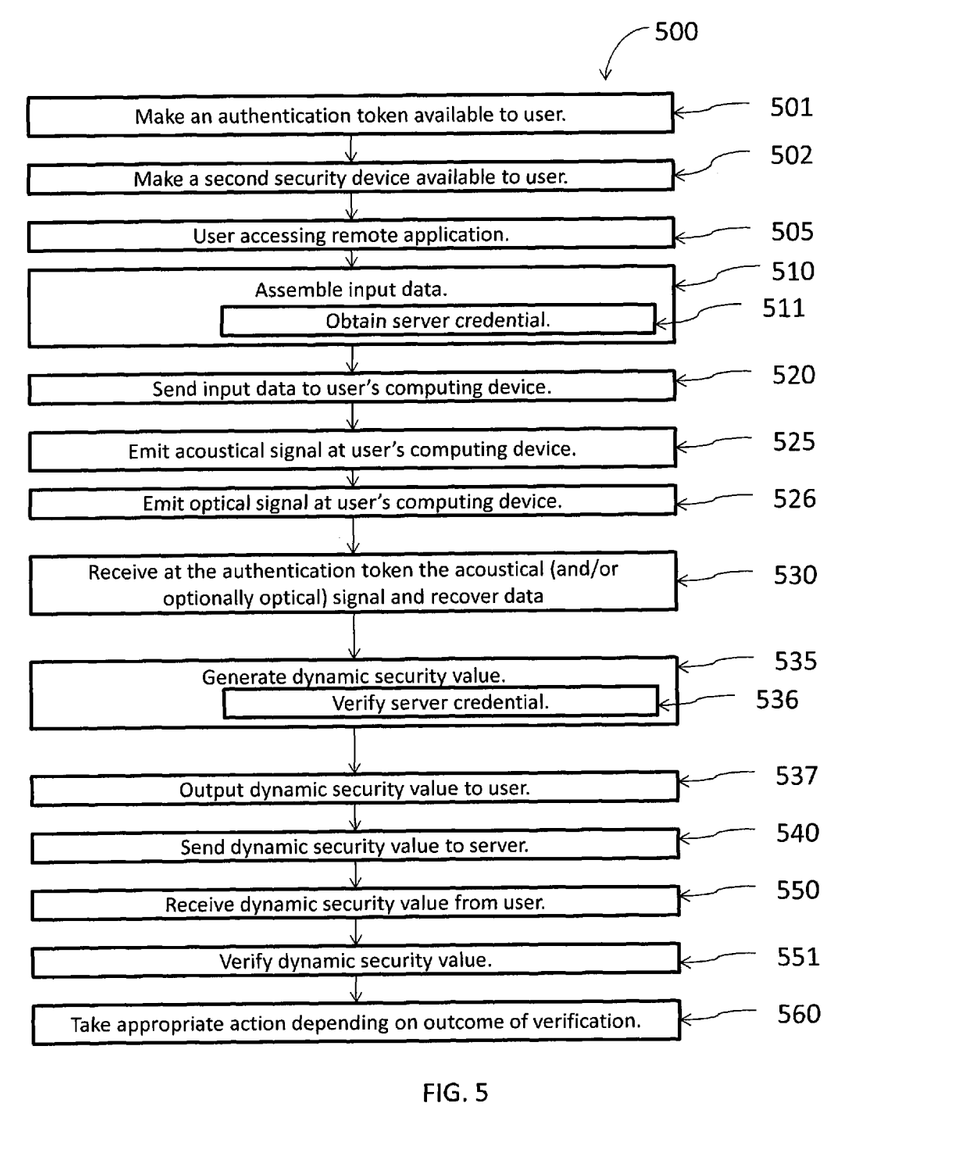
FIG. 5 is a flow chart depicting a method for secure user access to a remote application.

FIG. 5 illustrates various steps of a method (500) according to an aspect of the invention to secure a user's access to a remote application. In some embodiments some steps may be performed in a different order than described here. In some embodiments some steps may be omitted. In some embodiments extra steps may be performed.

In step 501 an authentication token with an acoustical input interface (such as one of the authentication tokens (100/101) described in any of the preceding paragraphs) is made available to a user. In (optional) step 502 also a removable second security device (102) such as a smart card (which may be a financial card compliant with the EMV standard) is made available to the user e.g. to be used in conjunction with the authentication token (100/101) (in which case the authentication token (100/101) may comprise a communication interface to communicate with the second security device (102)).

In step 505 the user is accessing the remote application (hosted by an application server) from a computing device (such as a PC, Tablet Computer or Smartphone) e.g. over a communication network which may comprise for example a (computer) network such as the internet or a (mobile) telephone network and using for example a web browser running on the computing device.

In step 510 an application or application server assembles input data. The input data may for example comprise a challenge or transaction related data or transaction context related data or a server credential. In the (optional) sub-step 511 the application or application server generates the server credential.

In step 520 the application or application server sends the input data (for example embedded in one or more web pages) to the user's computing device that the user is using to access the remote application e.g. over the internet.

In step 525 the user's computing device is made to emit a modulated acoustical signal that encodes the input data. In (optional) step 526 the user's computing device is made to emit an optical signal that encodes data. In some embodiments the data encoded in the optical signal comprises part or all of the data encoded in the acoustical signal.

In step 530 the acoustical token (100/101) receives the acoustical and/or the optical signal and recovers the data encoded in the acoustical and/or optical signal.

In step 535 the acoustical token (100/101) generates a dynamic security value. The authentication token (100/101) may generate the dynamic security value as described in any of the preceding paragraphs. In some embodiments the acoustical token (100/101) may use data recovered from the acoustical and/or the optical signal for the generation of the dynamic security value. In step 536 the authentication token (100/101) verifies a server credential comprised in the data recovered from the acoustical and/or the optical signal. In some embodiments the generation of the dynamic security value is conditional on the successful verification of the server credential. In step 537 the authentication token (100/101) outputs the generated dynamic security value to the user.

In step 540 the user sends the generated dynamic security value to the application or application server, for example by typing the digits making up the dynamic security value into a form field of a web page of the application.

In step 550 the application or application server receives the dynamic security value. In step 551 the application or application server verifies the received dynamic security value. This verification may happen as described in some of the preceding paragraphs.

In step 560 the application or application server takes appropriate action which depends on the outcome of the verification of the received dynamic security value, as described in some of the preceding paragraphs.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature of the present invention may have been disclosed with respect to only one of several implementations, such feature may be combined with one or more other features of the other implementations as may be desired and advantageous for any given or particular application. While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. Thus, the breadth and scope of the present invention should not be limited by any of the above described exemplary embodiments but should be defined only in accordance with the following claims and their equivalents.

The invention claimed is:

1. A strong authentication token for generating dynamic security values comprising:
    a trustworthy user output interface for communicating generated dynamic security values to a user;
    an acoustical input interface for acoustically receiving input data, the acoustical interface comprising a microphone and a demodulation circuit connected to the microphone adapted to demodulate an acoustical signal received by the microphone, wherein the acoustical signal is modulated using a frequency shift keying modulation scheme using a plurality of coding frequencies to code the acoustical signal, whereby each coding frequency is an integer multiple of a common base frequency, and wherein the demodulation circuit comprises a phase-locked loop tuned to the common base frequency and receiving as input an electrical signal representative of the received acoustical signal; and
    a data processing component connected to the demodulation circuit, the data processing component adapted to recover input data transmitted in the received acoustical signal after the acoustical signal is demodulated by the demodulation circuit, to process the recovered input data, and to generate the dynamic security values.

2. The token of claim 1, wherein the demodulation circuit is further adapted to detect the power of each coding frequency present in the received acoustical signal and to compare the relative power of each coding frequency.

3. The token of claim 1, wherein the demodulation circuit further comprises:
    a plurality of power detection sub-circuits, one for each coding frequency; each power detection sub-circuit outputting an output signal indicative of the power in the received acoustical signal of the coding frequency that the power detection sub-circuit is associated with;
    a ratio detector connected to the outputs of the power detection sub-circuits and adapted to compare the output signals of the power detection sub-circuits and to output a signal indicating which coding frequency has the highest power in the received acoustical signal.

4. The token of claim 3, wherein each power detection sub-circuit comprises:
    a demodulator component taking as input an electrical signal representative of the received acoustical signal, and
    a low-pass filter connected to the demodulator component for filtering the output of the demodulator component it is connected to.

5. The token of claim 4, further comprising a band-pass filter adapted to filter an electrical signal representative of the received acoustical signal and that outputs at least one of the electrical signal representative of the received acoustical signal that is input to the phase-locked loop or the electrical signals representative of the received acoustical signal input to the demodulator components, and that is further adapted to suppress frequencies lower than the lowest coding frequency and to suppress frequencies higher than the highest coding frequency.

6. The token of claim 4, wherein at least one low-pass filter has a cut-off frequency less than twice the baud rate of the received acoustical signal.

7. The token of claim 6:
wherein the phase locked loop is further adapted to generate for each coding frequency a reference signal associated with that coding frequency, whereby each reference signal is an integer multiple of the frequency the phase locked loop is locking to, and
whereby the multiplication factor between each reference signal and the frequency the phase locked loop is locking to is the same as the multiplication factor between the coding frequency the reference signal is associated with and the common base frequency, and
wherein each demodulator component also takes as input the reference signal associated with the coding frequency that the demodulator component is associated with, and
wherein each demodulator component generates an output signal that contains a low-frequency component indicative of the power in the received acoustical signal at the frequency of the reference signal generated by the phase-locked loop that the demodulator component takes as input.

8. The token of claim 7, wherein the demodulator components comprise a synchronous AM demodulator.

9. The token of claim 7, wherein the demodulator components comprise a product detector.

10. The token of claim 7, wherein the demodulator components comprise a conditional inverter.

11. The token of claim 7, wherein the demodulator components comprise a double-balanced mixer.

12. The token of claim 7, wherein at least one demodulator component comprises a component that is adapted to multiply the electrical signal representative of the received acoustical signal input to the demodulator component with the reference signal generated by the phase-locked loop input to the demodulator component.

13. The token of claim 1, further comprising a data storage component for storing secrets shared with a server and wherein said data processing component is further adapted to generate said security values using at least one of said secrets.

14. The token of claim 13, wherein the data processing component is further adapted to generate said security values by cryptographically combining at least one of said secrets with a dynamic variable.

15. The token of claim 14, wherein the cryptographically combining comprises performing a symmetric cryptographic algorithm.

16. The token of claim 14, wherein the dynamic variable comprises a time value.

17. The token of claim 14, wherein the dynamic variable comprises a counter value.

18. The token of claim 14, wherein the dynamic variable comprises a challenge value.

19. The token of claim 14, wherein the dynamic variable comprises a transaction data related value.

20. The token of claim 1, further comprising a compact manual user input interface, the compact manual user input interface comprising a navigation mechanism and a confirmation mechanism.

21. The token of claim 20, wherein the navigation mechanism comprises at least one navigation button and the confirmation mechanism comprises at least one confirmation button.

22. The token of claim 21, wherein the navigation mechanism consists of two navigation buttons and the confirmation mechanism consists of two buttons including an 'OK' button.

23. The token of claim 20, wherein the navigation mechanism comprises a scroll wheel.

24. The token of claim 1, wherein the token is a first security device and wherein the token further comprises a communication interface adapted to communicate with a removable second security device and wherein the token is adapted to generate the dynamic security values in cooperation with the second security device.

25. The token of claim 24, in which the removable second security device comprises a smart card.

26. The token of claim 24, wherein the token is adapted to generate at least one of the dynamic security values by sending a command to the second security device and deriving the at least one dynamic security value from the response of the second security device to said command.

27. The token of claim 26, wherein the token is adapted to include a challenge in said command and wherein response of the second security device is calculated by the second security device as a function of said challenge.

28. The token of claim 26, wherein the response by the second security device comprises a cryptogram that is calculated by the second security device by cryptographically combining a secret stored by the second security device with a counter value stored and maintained by the second security device using a symmetric cryptographic algorithm.

29. The token of claim 28, wherein the token is further adapted to derive a cryptographic key from the response of the second security device and to generate the at least one dynamic security value by cryptographically combining said cryptographic key with at least one transaction data related value.

30. The token of claim 1, further comprising an optical input interface.

31. The token of claim 30, further comprising an interface selection mechanism to select either the acoustical input interface or the optical input interface to receive input data.

32. The token of claim 31, wherein the token is further adapted to receive from the user an indication which of the acoustical input interface or the optical input interface the token should use.

33. The token of claim 31, wherein the interface selection mechanism is adapted to determine by means of heuristic rules on the basis of certain characteristics of the signals received through the acoustic input interface and the optical input interface which input interface to select to receive data.

34. The token of claim 31, wherein the token is adapted to apply a selection process which comprises trying for a first period of time to receive at least some data through a first one of the optical input interface or the acoustical input interface, and if the trying to receive at least some data during the first period of time is successful selecting the input interface being tried and continue receiving data through the selected input interface, and if the trying to receive at least some data during the first period of time is unsuccessful repeating the selection process with the other of the optical input interface or the acoustical input interface for a second period of time.

35. The token of claim 31, in which the token is further adapted to detect transmission errors in the data received through the currently selected input interface and to return to selecting either the acoustical input interface or the optical input interface in case one or more pre-defined criteria concerning the detected transmission errors are met.

36. The token of claim 30, adapted to concurrently receive data through both the optical input interface and the acoustical input interface.

37. The token of claim 30, further adapted to combine data received through the optical input interface with data received through the acoustical input interface.

38. The token of claim 1, further comprising an optical user interface and a smart card interface to communicate with a standard credit card sized smart card, whereby the data processing component is further adapted to generate transaction data signatures by generating a message authentication code (MAC) over transaction data input into the token through the acoustical input or optical input interface, whereby the data processing component generates the MAC using a symmetric cryptographic algorithm with a secret key that is derived from a cryptogram generated by the smart card.

39. The token of claim 38, further comprising a manual user data input interface adapted for the user to input a personal identification number (PIN) value and wherein the token is further adapted to submit said PIN value to the smart card for verification prior to the smart card generating said cryptogram and to erase from memory any copy of the PIN value after the token has submitted said PIN value to the smart card for verification.

40. The token of claim 39, further comprising an interface selection mechanism to select either the acoustical or the optical input interface to receive input data.

41. The token of claim 1, wherein the input data comprise a server credential and wherein processing the token is further adapted to verify said server credential.

42. The token of claim 41, wherein said generating of the dynamic security values is conditional upon said verifying of said server credential being successful.

43. The token of claim 41, further comprising a data storage component for storing secrets shared with a server and wherein said data processing component is further adapted to verify said server credential using at least one of said secrets and a symmetric cryptographic algorithm.

44. A strong authentication method for use with an authentication token, the method comprising:
    receiving an acoustical signal including input data from a remote computer system at the authentication token, wherein the acoustical signal is modulated using a frequency shift keying modulation scheme using a plurality of coding frequencies to code the acoustical signal, whereby each coding frequency is an integer multiple of a common base frequency;
    obtaining the input data by demodulating the acoustic signal with a demodulation circuit, wherein the demodulation circuit comprises a phase-locked loop tuned to the common base frequency and receiving as input an electrical signal representative of the received acoustical signal; and
    generating a dynamic security value at the authentication token by recovering input data from the acoustical signal and processing the recovered input data.

45. The method of claim 44, wherein the authentication token comprises a communication interface for communicating with a removable security device and the generating step comprises:
    generating the dynamic security value with the authentication token in cooperation with the removable security device.

46. The method of claim 44, further comprising:
    receiving an optical signal including additional input data; and
    wherein the generating step comprises combining the recovered input data and the additional input data.

47. A method for securing access by a user to a remote application, the method comprising:
    making available to the user an authentication token according to claim 1;
    assembling input data;
    sending the input data to a user's computing device;
    emitting at the user's computing device a modulated acoustical signal that encodes the input data for reception by the user's authentication token;
    receiving from the user a dynamic security value generated by the user's authentication token wherein the authentication token generates and outputs to the user the dynamic security value after receiving and demodulating the acoustical signal and recovering the input data;
    verifying the received dynamic security value;
    taking action depending on the outcome of verifying the received dynamic security value.

48. The method of claim 47 further comprising emitting at the user's computing device an optical signal encoding at least a part of the input data for reception by the authentication token.

49. The method of claim 47 further comprising the steps of obtaining a server credential and including the server credential in the input data, and wherein the server credential is being verified by the authentication token and wherein the generation of the dynamic security value is dependent on the verification of the server credential.

50. The method of claim 47 further comprising making available to the user a second security device, and wherein the authentication token comprises a communication interface to communicate with the second security device and wherein the authentication token generates the dynamic security device in cooperation with the second security device.

* * * * *